(12) United States Patent
Carminati et al.

(10) Patent No.: US 11,802,639 B2
(45) Date of Patent: Oct. 31, 2023

(54) COMPOSITE TUBULAR ELEMENT AND RELEVANT MANUFACTURING METHOD

(71) Applicant: ENI S.P.A., Rome (IT)

(72) Inventors: Stefano Carminati, San Donato Milanese (IT); Massimo Zampato, Venice (IT); Mariangela Lombardi, Turin (IT); Matteo Pavese, Gassino Torinese (IT)

(73) Assignee: ENI S.P.A., Rome (IT)

( * ) Notice: Subject to any disclaimer, the term of this patent is extended or adjusted under 35 U.S.C. 154(b) by 224 days.

(21) Appl. No.: 17/415,832

(22) PCT Filed: Dec. 18, 2019

(86) PCT No.: PCT/IB2019/061029
§ 371 (c)(1),
(2) Date: Jun. 18, 2021

(87) PCT Pub. No.: WO2020/128907
PCT Pub. Date: Jun. 25, 2020

(65) Prior Publication Data
US 2022/0049798 A1    Feb. 17, 2022

(30) Foreign Application Priority Data

Dec. 18, 2018  (IT) .................. 102018000020056

(51) Int. Cl.
*F16L 9/12*    (2006.01)
*B29C 70/24*   (2006.01)
(Continued)

(52) U.S. Cl.
CPC ............. *F16L 9/12* (2013.01); *B29C 70/24* (2013.01); *B32B 5/06* (2013.01); *B32B 5/26* (2013.01);
(Continued)

(58) Field of Classification Search
CPC ......... F16L 9/12; B29C 70/24; B32B 2250/20
(Continued)

(56) References Cited

U.S. PATENT DOCUMENTS 4,972,880 A * 11/1990 Strand ................. F16L 55/1656
174/DIG. 8
5,077,107 A * 12/1991 Kaneda .................... B32B 25/10
428/36.1
(Continued)

FOREIGN PATENT DOCUMENTS

CN    103465478 A    12/2013
CN    106885062 A    6/2017
(Continued)

OTHER PUBLICATIONS

International Search Report dated Apr. 6, 2020 for PCT Appl. No. PCT/IB2019/061029.
(Continued)

*Primary Examiner* — Patrick F Brinson
(74) *Attorney, Agent, or Firm* — Ruggiero McAllister & McMahon LLC (57) ABSTRACT

Tubular structures for use in a subsea environment and a method of manufacturing the same are provided. These composite tubular structures can be used in the oil and gas industry, for example, as production risers.

25 Claims, 4 Drawing Sheets

(51) Int. Cl.
*B32B 5/06* (2006.01)
*B32B 5/26* (2006.01)

(52) U.S. Cl.
CPC ..... *B32B 2250/20* (2013.01); *B32B 2260/023* (2013.01); *B32B 2260/046* (2013.01); *B32B 2262/101* (2013.01); *B32B 2597/00* (2013.01)

(58) Field of Classification Search
USPC .............................. 138/98, 97, 123–126, 172
See application file for complete search history.

(56) References Cited

U.S. PATENT DOCUMENTS

| | | | | |
|---|---|---|---|---|
| 5,921,285 | A | * | 7/1999 | Quigley ..................... F16L 9/19 |
| | | | | 138/123 |
| 5,937,910 | A | * | 8/1999 | Chandler ................... B01J 2/18 |
| | | | | 264/269 |
| 6,016,845 | A | * | 1/2000 | Quigley ................. F16L 9/125 |
| | | | | 138/144 |
| 2004/0231789 | A1 | * | 11/2004 | Blackmore ........... F16L 55/179 |
| | | | | 138/98 |
| 2008/0277013 | A1 | | 11/2008 | Anders et al. |
| 2012/0291903 | A1 | * | 11/2012 | Ekelund ................ B29C 53/805 |
| | | | | 138/97 |
| 2013/0255821 | A1 | | 10/2013 | Martin et al. |
| 2014/0041879 | A1 | | 2/2014 | Martin et al. |
| 2018/0195646 | A1 | | 7/2018 | Berger et al. |

FOREIGN PATENT DOCUMENTS

| | | |
|---|---|---|
| EP | 2927358 A1 | 10/2015 |
| WO | 199967561 A1 | 12/1999 |
| WO | 2006059220 A2 | 6/2006 |
| WO | 2010096671 A1 | 8/2010 |
| WO | 2013050978 A2 | 4/2013 |
| WO | 2013071449 A1 | 5/2013 |

OTHER PUBLICATIONS

Written Opinion dated Apr. 6, 2020 for PCT Appl. No. PCT/IB2019/061029.

* cited by examiner

COMPOSITE TUBULAR ELEMENT AND RELEVANT MANUFACTURING METHOD

CROSS-REFERENCE TO RELATED APPLICATIONS

This application is a national stage application, filed under 35 U.S.C. § 371, of International Patent Application No. PCT/IB2019/061029, filed on Dec. 18, 2019, which claims priority to Italian Patent Application No. 102018000020056, filed on Dec. 18, 2018, the entire disclosure of which is incorporated herein by reference.

BACKGROUND OF THE DISCLOSURE

1. Field of the Disclosure

The present disclosure relates to tubular structures for use in a subsea environment. More particularly, the disclosure relates to composite tubular structures for use in the oil and gas industry, such as production risers, and a method of manufacturing the same.

2. Description of the Related Art

Several patents filed in the last few years concerning flexible composite risers and pipes show the use of rather similar materials and structures.

WO 2013/071449 describes a bonded structure, with three main sections (inner, reinforcement and outer layers). The reinforcement layers are realized by helically wrapping tapes made of fiber-reinforced thermoplastic polymers. In addition, some specific data about the suitable materials (polymers and fibers) for each layer are reported, specifying the selection parameters in terms of thermal and/or mechanical properties, chemical compatibility or requirements related to installation or working conditions.

WO 1999/67561 describes a bonded structure, with three main sections (inner, reinforcement and outer layers). This document describes reinforcement layers, that are realized by using several laminates of thermoplastic or thermosetting polymers reinforced with unidirectional continuous fibers. In addition, some specific data about the suitable materials (polymers and fibers) for each layer are reported, with compositional or microstructural changes in each layer in order to make them able to endure local temperature or pressure conditions optimizing their compatibility.

A proposed configuration of the riser includes a reinforcing polymer element built up of single layers of different fiber reinforced thermoplastic matrices. Furthermore, the described riser design can also include intermediate layers of a neat thermoplastic polymer among different fiber reinforced thermoplastic matrices. These layers are designed to work as crack stoppers and to improve the thermal insulation between the other layers. The presence of sub-layers without fibers will also allow some sliding between adjacent fiber reinforced layers, making the tube more flexible.

The composite riser is employed in the definition of a hybrid riser system in WO 2006/059220, to obtain a lower load transfer to the floating unit through the coupling with an upper and lower metallic or un-bonded end pipe section. The system is made by a central composite conduit section that constitutes most of the length of the riser and is much longer than upper or the lower end pipe section.

WO 2010/096671 describes a bonded structure, with three main sections (inner, reinforcement and outer layers). The reinforcing middle layer is characterized by a multilayer structure obtained with an inner middle layer realized in composite tapes, a thermoplastic middle layer and an outer middle layer made of a harder thermoplastic, as described below. The manufacturing system is claimed to be portable. In addition, some specific data about the suitable materials (polymers and fibers) for each layer are reported.

In WO 2010/096671 a composite pipe with a thermoplastic inner layer, a tape layer bonded on the thermoplastic one and a protective layer formed exterior to the tape layer is described. The pipe has three layers: the inner layer may be a thermoplastic layer; the middle layer may be a reinforcing composite tape layer, which may include a fully wetted tape, and which may be further encased or enclosed in a thermoplastic; finally, the outer protective layer may be a protective layer made of a thermoplastic material. In a different configuration, the middle layer is a multi-layer structure, in which the inner middle layer may be a reinforcing composite tape layer, the middle layer may be a thermoplastic extrudate or film layer, and the outer middle layer may be a stiff layer made of a harder thermoplastic.

US 2014/0041879 describes a riser characterized by defined pre-stressed portions (with regions in tension or in compression) in order to obtain a spatial arrangement and define an inflection point. The peculiarity of this patent consists in the presence of a local variation of composition or microstructure of the composite wall in order to impose a pre-stress state to the riser portions, in particular with the upper and the lower regions in tension and, consequently, the intermediate one in compression.

US 2013/0255821 describes a riser characterized by walls made of composites, with a plurality of reinforcing fibers embedded in a matrix. The riser comprises a local variation of composition or microstructure of the composite wall, with a consequent change in mechanical properties (strength, stiffness, flexural rigidity, bending, modulus of elasticity, etc.) or in thermal features (coefficient of thermal expansion, thermal conductivity).

CN 103465478 describes a flexible rubber tube comprising of an inner wall, an outer wall and a skeleton made from a weft knitted fabric with three-dimensional structure. The scope of the disclosure is to improve flexibility of the tube and to make the tube strong and impact resistant.

The weft-knitted fabric is a single-sided, ribbed or ingot fabric structure. The fabric is woven from single or multiple fiber yarns, or it is woven from a knitted tape (woven from single or multiple fiber yarns). It can also be obtained by weaving a fiber yarn and a metal wire. The only mentioned fiber type is aramid type. The polymer used is epoxy resin, "plastic", rubber or polyurethane.

CN 106885062 describes a conveying pipe made of a tubular three-dimensional fabric. The pipe is characterized by a three-dimensional fabric woven from high-strength fibers, and a resin or rubber matrix. The fabric is preferentially a three-dimensional orthogonal fabric or a three-dimensional "interlocking tubular fabric", and the fibers are high strength.

US 2008/277013 discloses a coating for repairing pipes and ducts. The coating of US 2008/277013 discloses a multilayer composition in which there is an interwoven layer comprising a three-dimensional "reticular" structure composed of glass or carbon fibers interwoven with polymeric material to form the filaments of this structure. According to US 2008/277013, the intertwined layer, before installation, is impregnated with a resin which penetrates the entire layer, filling the empty spaces of the three-dimensional structure.

At present, composite tubular elements such as risers, pipes and the like, formed from layers as described in the examples above, suffer from delamination phenomena, which limit the mechanical resistance of the tubular element and lead to failure. Cracks propagate between the layers, in particular where the local loading is a mixture of mode I-mode II type. At present local toughening is employed to increase the resilience of the polymeric matrix but offers merely an incremental improvement.

SUMMARY OF THE DISCLOSURE

According to the present disclosure, there is provided a composite tubular element for use in a subsea environment, the composite tubular element comprising:
at least a first layer comprising first fibres oriented in an x-direction relative to the longitudinal axis of the tubular element, and second fibres oriented in a y-direction relative to the longitudinal axis of the tubular element, thereby forming a two-dimensional tubular structure;
third fibres extending at least partially through the wall thickness of the tubular element, thereby forming a three-dimensional tubular structure;
  a first thermoplastic polymer arranged to further embed the fibres of the tubular structure and thereby consolidate the tubular structure; and
  a second polymer arranged to fill residual porosity of the tubular structure and thereby form the tubular element.

Also according to the present disclosure, there is provided a method of manufacture of a composite tubular element, the method including the steps of:
producing a two-dimensional tubular structure comprising first fibres oriented in an x-direction relative to the longitudinal axis of the tubular element, and second fibres oriented in a y-direction relative to the longitudinal axis of the tubular element;
inserting third fibres at least partially through the wall thickness of the tubular element, to produce a three-dimensional tubular structure;
combining the fibres with a first thermoplastic polymer; and
applying a second polymer to fill residual porosity of the tubular structure to form the composite tubular element.

The tubular element formed in accordance with the disclosure has strong adhesion throughout the cross-section of the tubular element. Where a plurality of layers is built up, the tubular element advantageously has improved resistance to delamination phenomena and crack propagation as a result of stress and loads experienced by the tubular element in use.

Optionally at least one of the first, second, and/or third sets of fibres is continuous. Optionally at least one of the sets of fibres is non-crimped. Optionally one or more sets of fibres may be glass fibres, optionally S2-type glass fibres. Alternatively, the fibres may be carbon fibres, aramid fibres, or similarly suitable fibres.

Glass fibres offer the advantage of a similar mechanical strength to e.g. carbon fibre, but with a lower Young's modulus (typically carbon fibre may have a Young's modulus of the order of 200 GPa, while glass fibre is around 70-90 GPa). Additionally, the density of glass fibre is higher than the density of carbon fibre. The use of glass fibre thus offers the advantage that the reels needed to transport the wound tubular elements in accordance with the disclosure may be much smaller than an equivalent state-of-the-art tubular element such as a composite pipe or riser, reducing costs. The stresses experienced by the wound tubular element are reduced, with a lower risk of damage to the tubular element prior to deployment.

The use of glass fibres, instead of carbon fibres, results in a lower longitudinal stiffness of the resulting tubular element which has the advantage that stress acting on the tubular element is lower, and therefore a lower fibre fraction is required in the tubular element. A reduction in mechanical strength that might be experienced, depending on the manner of insertion of the third fibres through thickness, is easily accommodated and does not negatively affect the performance of the tubular element.

Where the tubular element may be part of a riser assembly, for example, the lower longitudinal stress and higher flexibility of the tubular element means that stresses acting on the upper riser assembly and on the lower riser assembly are lower, permitting the use of more simple structures for transferring the load from the riser to the wellhead or the surface structure. Buoyancy devices used to float the riser may be reduced in size, reducing costs and further reducing stresses acting on the riser.

Optionally the two-dimensional tubular structure comprising the first and second fibres may be formed by weaving or braiding, for example biaxial or optionally triaxial braiding. Triaxial braiding offers enhanced mechanical resistance to loads in the x-direction (longitudinal direction).

Optionally the structure is formed of superimposed first and/or second fibres. Optionally the first and/or second fibres are straight (i.e. non-crimped) fibres, optionally continuous fibres. Optionally the tubular element may be formed of non-crimp fabrics, which comprise superimposed straight fibres oriented in the x- and y-directions. Using straight fibres maximises the mechanical performance of the fibres in the x-(longitudinal) and y-(hoop) directions.

Optionally, where the two-dimensional tubular structure is formed by triaxial two-dimensional (2D) braiding, fibres of different sizes may be used in each direction. For example, the braid comprising first fibres, that is, the braid oriented in the x-direction parallel to the longitudinal axis of the tubular element, may be thicker than the braids in the other directions. Optionally the angle of the braids may be varied from the standard quasi-isotropic triaxial braid having braids oriented at 0°, +60°, and −60°, in order to completely tailor the mechanical resistance along the x- and z-directions relative to the longitudinal axis of the tubular element. For example, the braids in the x-y plane of a triaxially braided tubular structure may be oriented at angles e.g. φ1, φ2 between 30°-80°, or optionally between 45° and 75° relative to the longitudinal fibres. Optionally the fraction of fibres in the x-, z-, φ1-, and φ2-directions may vary according to the requirements set by the design of the tubular structure. Different fractions or layout of the fibres can thus be present along the different directions and along the longitudinal axis of the tubular structure, permitting tailoring of the mechanical properties such as stiffness and strength of the composites in the different directions.

Some exemplary ranges of fibre fractions for a tubular structure formed by 2D braiding are: fibres in the x-direction between 20-70 vol %; fibres in the z-direction between 1-20 vol %; and the remaining fibre fraction being those aligned along the φ1-, and φ2-directions. For example, for a tubular element that is significantly stressed in the longitudinal (x) direction, the fractions may be 60 vol % in the x-direction, 10 vol % in the z-direction, and 30 vol % for those in the φ1-, and φ2-directions. For a triaxial quasi-isotropic braiding giving almost isotropic properties in the x-y plane and with good strength in the z-direction, the fractions may be 30 vol % in the x-direction; 10 vol % in the z-direction, and 60 vol % in the φ1-, and φ2-directions.

Optionally the first and second fibres may be grouped in the form of pre-consolidated tapes, for example aligned glass fibres impregnated with PEEK. Optionally the tapes are superimposed on each other. Optionally the tapes are woven or braided to form the two-dimensional tubular structure. Optionally the width of the tapes may be different in different directions, for example the width of the tapes comprising the first fibres may be different to the width of the tapes comprising the second fibres. Optionally the number of tapes that are simultaneously braided along a given direction may be altered. Optionally the tapes are as narrow as possible in order to produce a high-density tubular structure.

Optionally, where the tubular structure is formed by three-dimensional (3D) weaving, the relative fractions of fibres oriented in x-, y-, and z-directions respectively may be varied, for example to tailor the mechanical properties of the tubular element in all directions, e.g. stiffness and strength in the x-, y-, and z-directions. Tailoring of the mechanical properties is most effectively achieved with non-crimp weaving technologies.

Some exemplary ranges of fibre fractions for a tubular structure formed by 3D weaving are: fibres in the x-direction between 30-80 vol %; fibres in the y-direction between 10-50 vol %; and fibres in the z-direction between 1-20 vol %. For example, for a tubular element that is heavily stressed in the longitudinal (x) direction, the fractions may be 70 vol % in the x-direction, 25 vol % in the y-direction, and 5 vol % in the z-direction. For a tubular element subject to medium longitudinal stress and high pressure, the fractions may be 45 vol % in the x-direction, 45 vol % in the y-direction, and 10 vol % in the z-direction. For a tube that is subject to very high risk of delamination, the fractions may be 40 vol % in the x-direction, 40 vol % in the y-direction, and 20 vol % in the z-direction.

Optionally fibres of different sizes may be used in any of the x-, y-, z-, φ1-, and/or φ2-directions.

Optionally the tubular structure, and thereby the tubular element, may have more than one co-axial layer of fibres. Optionally in order to create the composite tubular element, the fibres may be triaxially braided to form one two-dimensional layer at a time. Optionally once the final two-dimensional layer is completed, the third fibres are then inserted into/through the layers. Optionally the third fibres may extend all of the way through the wall thickness of the tubular structure. Optionally the third fibres comprise a radial component. Optionally the third fibres may be oriented at an angle relative to the longitudinal axis of the tubular structure, for example 50°-130°. Optionally the third fibres may be oriented in the z-direction, i.e. in a direction that is perpendicular to the longitudinal axis of the tubular structure.

The third fibres may be added to the two-dimensional tubular structure by stitching, z-pinning, tufting, or a similar technique, thereby producing a three-dimensional structure. Optionally the third fibres are straight fibres. Optionally the third fibres are continuous fibres. Continuous fibre definition is a well-known parameter in the field of composites. Alternatively, the third fibres may be discontinuous fibres, in which case the length of the third fibres must be greater than the critical length of the fibre. The critical length of fibre is a well-known parameter in the field of composites with discontinuous reinforcement. Optionally this length may be at least equal to the whole thickness of the tube wall. Ensuring the fibres are of a length greater than the critical length of the fibre ensures that the mechanical performance of the fibre is maintained.

Optionally, where stitching, z-pinning, or tufting is used to form the three-dimensional reinforcement of the tubular element, the initial two-dimensional tubular structure is optionally formed by a two-dimensional technique such as weaving or braiding of the fibres.

Optionally where fibre braiding is used, a standard mandrel may be used and stitching, z-pinning, tufting etc. may then be carried out directly on the tubular structure. The braiding of the fibres leaves voids through which a needle can access the fibres for stitching, z-pinning, tufting etc. operations.

Where pre-consolidated tapes are braided to form the tubular structure, the mandrel optionally includes pins on its outer surface, for example hollow pins, where the pins are optionally configured to perforate the tapes lying in the x-y plane and form holes in the tubular structure through which the stitching, z-pinning, tufting etc. may be performed. The density of the tapes means that the tapes are not easily perforated by a needle during normal stitching, z-pinning, tufting etc. operations, and therefore the addition of pins on the mandrel ensures that there are voids created through which the stitching/z-pinning/tufting operations may take place.

Optionally the first thermoplastic polymer is included in the tubular structure together with the fibres, forming a polymer matrix composite. Optionally the fibres may be pre-coated with the thermoplastic polymer. Optionally the fibres are co-mingled with the thermoplastic polymer. Optionally the fibres and the thermoplastic polymer are in the form of dense pre-consolidated tapes. Optionally the pre-consolidated tapes may be braided to form the tubular structure. Braiding of the pre-consolidated tapes results in a higher density of fibres in the composite tubular element than a composite tubular element produced from fibres not in tape form.

Including the thermoplastic polymer at the same time as the fibres means that both the fibres and the thermoplastic polymer are woven or braided in the formation of the two-dimensional tubular structure, for example. This results in a lower fibre density in the tubular structure. However, due to the advantageous reduction of longitudinal stiffness of the tubular element, the longitudinal stress on the tubular element is also reduced, and therefore the tubular element may withstand the stress with a lower fibre density.

Optionally consolidation of the tubular structure with the thermoplastic polymer is carried out by melting the thermoplastic polymer at a high temperature, optionally without the application of pressure to the tubular structure. Not applying pressure to the tubular structure offers the advantage that the set of third fibres, oriented through the wall thickness for instance in the z-direction, are not deformed, therefore they remain straight and maintain their reinforcing qualities. In order to reduce or prevent bending and deformation of the through thickness fibres, porosity is left in the tubular structure during the formation of the tubular structure including the thermoplastic polymer. The resulting porosity is higher where triaxial weaving or braiding of fibres is used, followed by stitching, z-pinning, tufting etc. operations, and lower when tape braiding is used.

Melting the thermoplastic polymer at a high temperature advantageously gives rise to a strong three-dimensional matrix of the polymer and the fibres. Where dense tapes comprising fibres and the thermoplastic polymer are braided, melting of the thermoplastic polymer adheres the different layers of tapes to one another. This method reduces the porosity of the overall structure, as the resulting structure is of high density. Optionally the thermoplastic polymer can be polyether ether ketone (PEEK), polyphenylsulphone (PPSU), polysulphone (PSU), polyetherimide (PEI), polyimide (PI), polyamideimide (PAI), polybenzimidazole (PBI), or a similar polymer. Optionally the chosen polymer may vary according to the final application of the tubular element.

Optionally the thermoplastic polymer meets the following conditions:
Glass transition temperature (Tg) between 80° C.-150° C.; where Tg must be greater than the maximum working temperature that the tubular element will experience during use. For example, the polymer will be capable of withstanding the temperature of extracted fluid such as oil and/or gas without losing any of its mechanical properties;
High chemical resistance to fluid carried in the tube such as oil and corrosive substances, e.g. sulfidric acid (H2S)—the resistance requirements are that the material is optionally able to resist the fluid for a suitable minimum length of time in the unstressed state, and the mechanical properties of the material are optionally within approximately 10%-15% of the original properties after the material is removed from exposure to the fluid;
Low, or no, swelling due to contact with the fluid, e.g. oil or other substances—the composite material optionally absorbs less than 1% in volume (with reference to the tubular wall); and
Low permeability to selected gases, e.g. methane CH4, sulfidric acid H2S, etc.—optionally, the material may have a permeation coefficient lower than 10-8 cm2s-1atm-1.

Optionally the second polymer is a thermosetting polymer, but may be a thermoplastic polymer. Optionally the second polymer is applied to the tubular structure at the same time as the first thermoplastic polymer is melted, under high temperature conditions. This permits consolidation of the structure of the tubular element to its full density, and filling of the pores left in the fibre/thermoplastic polymer structure, in a single step. Alternatively, the second polymer is applied to the tubular structure after the thermoplastic polymer, for example by vacuum infusion.

Optionally the second polymer has a lower Young's modulus than the polymer matrix composite. Use of a second polymer to fill pores or voids left in the formation of the polymer matrix composite has the effect of further reducing the Young's modulus of the tubular element with respect to the composite alone. This further reduction has the beneficial effect of reducing the longitudinal stresses along the tubular element.

Optionally the second polymer has low viscosity in the second polymer's liquid state, e.g. <50 Poise, i.e. at the temperature at which the second polymer is applied to the fibre/thermoplastic polymer structure. A low viscosity advantageously enhances the filling of voids in the tubular structure by the second polymer.

Optionally the second polymer has higher deformability than the polymer matrix composite. This allows the second polymer to better adapt to the tubular structure comprising the fibres and thermoplastic polymer, thereby reducing or eliminating the formation of cracks and/or porosity that could lead to reduced corrosion resistance of the tubular element.

Optionally the second polymer is an elastomer, optionally a thermoset elastomer. A thermoset elastomer has the advantage that it is sufficiently viscous in the molten state to fill the remaining voids in the tubular structure. A thermosetting polymer, e.g. a thermoset elastomer, further has the advantage that is does not require any adaptation of the glass transition/softening temperature of the tubular element to take account of the service temperature of the tubular element in use, as would be necessary when the second polymer is a thermoplastic polymer.

Optionally the second polymer swells slightly when in contact with fluid such as oil, which may be determined by the amount of liquid material that can be absorbed by the polymer, where less than 5% in volume is preferable. This is advantageous when the tubular element is used for oil and gas operations, for example, as a riser. Slight swelling of the second polymer when it comes into contact with fluid e.g. oil is advantageous in this situation, as it helps to e.g. seal the internal part of the riser when the inner surface comes into contact with fluid during the operation of the riser. Optionally the second polymer has a low permeability to fluid—optionally, the material may have a permeation coefficient lower than 10-8 cm2s-1atm-1.

Optionally the second polymer has high chemical resistance to fluid carried within the tubular element, for example oil and corrosive substances such as sulfidric acid (H2S), to a similar level as the first thermoplastic polymer. For example, the second polymer may resist the fluid for a suitable length of time when in the unstressed state. Optionally the mechanical properties of the material are within approximately 10% of the original property values after the material is removed from exposure to the fluid. Optionally the second polymer has a low Young's modulus at the temperatures that the polymer will be exposed to during use.

The various aspects of the present disclosure can be practiced alone or in combination with one or more of the other aspects, as will be appreciated by those skilled in the relevant arts. The various aspects of the disclosure can optionally be provided in combination with one or more of the optional features of the other aspects of the disclosure. Also, optional features described in relation to one aspect can typically be combined alone or together with other features in different aspects of the disclosure. Any subject matter described in this specification can be combined with any other subject matter in the specification to form a novel combination.

Various aspects of the disclosure will now be described in detail with reference to the accompanying figures. Still other aspects, features, and advantages of the present disclosure are readily apparent from the entire description thereof, including the figures, which illustrates a number of exemplary aspects and implementations. The disclosure is also capable of other and different examples and aspects, and its several details can be modified in various respects, all without departing from the scope of the present disclosure. Accordingly, each example herein should be understood to have broad application, and is meant to illustrate one possible way of carrying out the disclosure, without intending to suggest that the scope of this disclosure, including the claims, is limited to that example. Furthermore, the terminology and phraseology used herein is solely used for descriptive purposes and should not be construed as limiting in scope. Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present disclosure. It is not suggested or represented that any or all of these matters formed part of the prior art base or were common general knowledge in the field relevant to the present disclosure.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa. In this disclosure, the words "typically" or "optionally" are to be understood as being intended to indicate optional or non-essential features of the disclosure which are present in certain examples but which can be omitted in others without departing from the scope of the disclosure.

All numerical values in this disclosure are understood as being modified by "about". All singular forms of elements, or any other components described herein are understood to include plural forms thereof and vice versa. References to directional and positional descriptions such as upper and lower and directions e.g. "up", "down" etc. are to be interpreted by a skilled reader in the context of the examples described to refer to the orientation of features shown in the drawings, and are not to be interpreted as limiting the disclosure to the literal interpretation of the term, but instead should be as understood by the skilled addressee.

DETAILED DESCRIPTION OF EXAMPLES OF THE DISCLOSURE

Figure 1:
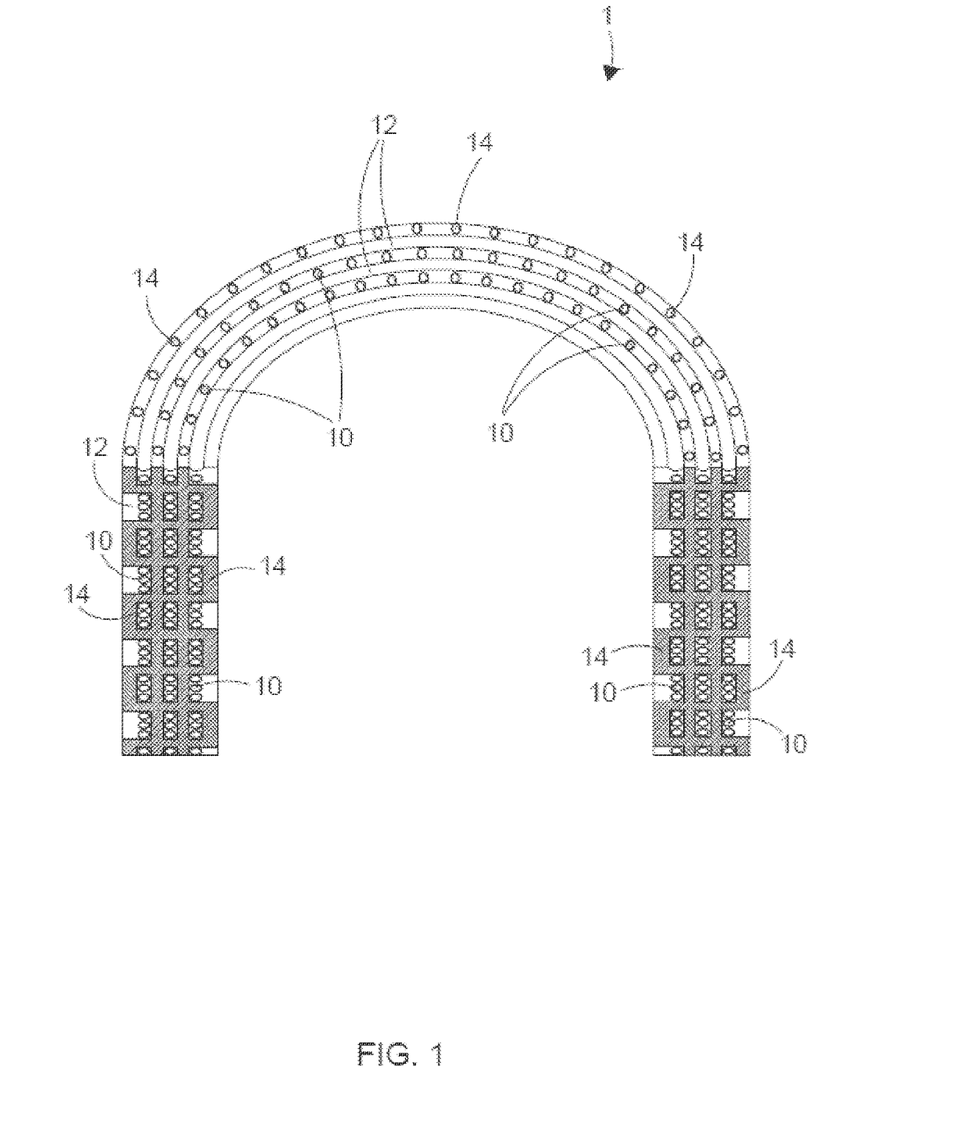
FIG. 1 shows a sectional schematic illustration of a tubular structure in accordance with the present disclosure.
Figure 2:
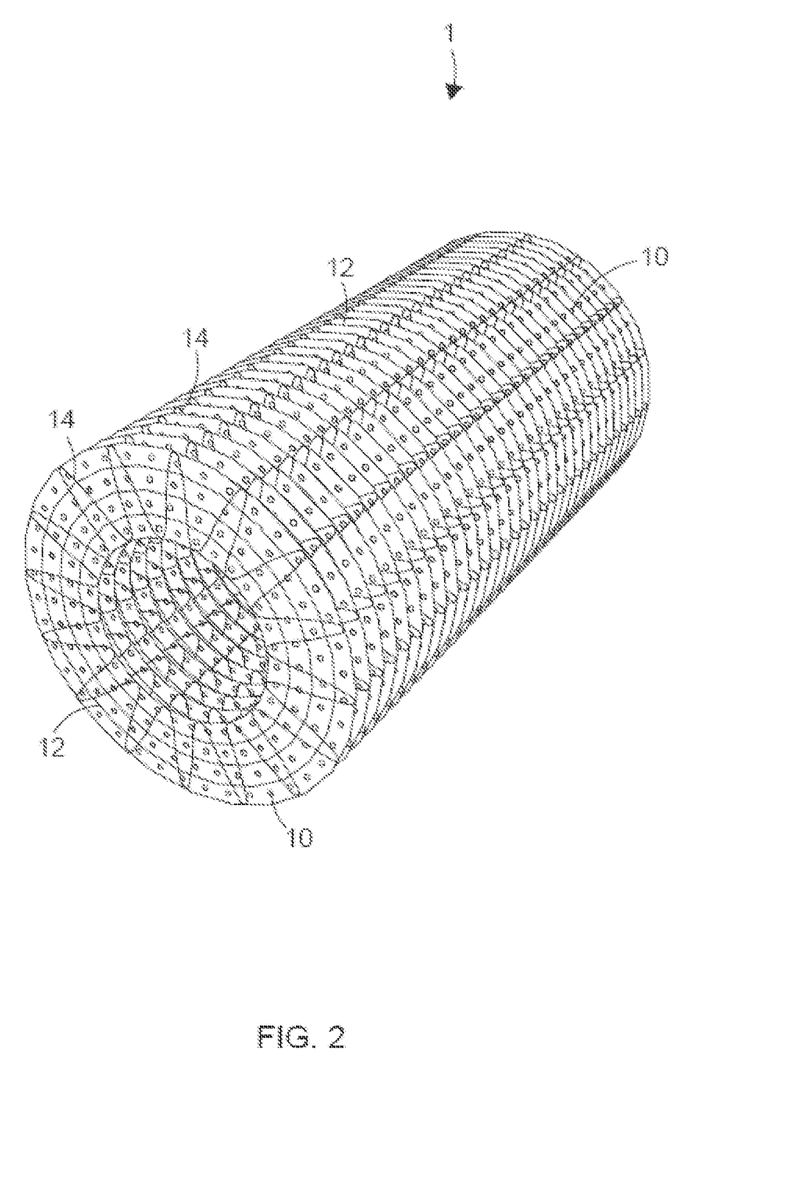
FIG. 2 shows a perspective view of a tubular structure with an example of the directions of the different fibres illustrated.
Figure 3A:
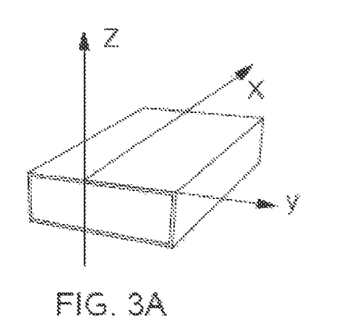
FIGS. 3a-3c show schematic illustrations of different arrangements of fibres and their respective orientations within the tubular structure.

Referring now to the figures, FIGS. 1 and 2 show examples of a tubular structure 1, which in this case is optionally in the form of a riser e.g. a production riser, string for chemical injection, piping for oil, water and gas transportation, formed of several layers, or plies 50, 55, of fibres extending in x-(longitudinal) 10 and y-directions (hoop) 12. The longitudinal 10 and hoop 12 fibres are triaxially braided together to create a two-dimensional (2D) structure in the first instance. FIG. 3c shows the directions of the fibres in terms of a cylindrical co-ordinate system, where the longitudinal fibres are along the axis labelled Z, and the hoop fibres are along the axis labelled θ.

Once the required number of plies 50, 55 have been reached in the tubular structure 1, continuous fibres through thickness, for instance in the z-direction 14 (in FIG. 3c, this is represented by the axis labelled r), are added by a process of stitching, tufting, or z-pinning. The through-thickness fibres 14 act to reinforce the different plies of longitudinal 10 and hoop fibres 12, reducing relative movement of the layers, and resisting delamination. The addition of the through-thickness fibres 14 produces a 3D composite preform.

The addition of the through-thickness fibres 14 may reduce the mechanical properties of the longitudinal 10 and hoop 12 fibres. To mitigate against this, non-crimped fibres can be used. The use of continuous straight fibres in the x- and y-directions 10, 12, improves the mechanical properties of the fibres in comparison to woven crimped fibres.

The fibres 10, 12, 14 are S2-type glass fibres 36 co-mingled with PEEK fibres 37 (see FIG. 5) which have a mechanical strength comparable to carbon fibres, but have a lower Young's modulus of around 70-90 GPa (in comparison to about 200 GPa for carbon fibre), making the resulting tubular structure 1 and final composite tube 90 more pliable. The density of the glass fibres is lower than carbon fibre, but by no more than 20%. The resulting impact on performance of the composite tube 90 is therefore minor.

Since the composite tube 90 is more pliable, in the example where the tube 90 is a riser, this means that reels needed to transport the wound riser are much smaller and the stresses experienced by the tube 90 due to the winding of the tube 90 onto the reel are much smaller, reducing the risk of damage to the tube 90 and reducing costs.

Furthermore, the mechanical stress on the tube 90 in the longitudinal direction is linked to the stiffness of the fibres, and therefore the tube 90. If the tube 90 is less stiff in comparison to e.g. a carbon fibre tube, this means that the stress acting on the tube 90 in the longitudinal direction is lower, and therefore the reduction in mechanical properties of the longitudinal 10 and hoop 12 fibres, i.e. in the x-y plane of the tube, can be better tolerated. In the case of a riser, a consequence of the lower longitudinal stress and the higher bending compliance of the riser is that stresses acting on the upper riser assembly and on the lower riser assembly are lower, requiring simpler systems for transferring the load from the riser to the wellhead or to the surface structure. Additionally, the air-can or the structure providing buoyancy to the riser can be made smaller, further reducing stresses acting on the riser and reducing costs.

Figure 3B:
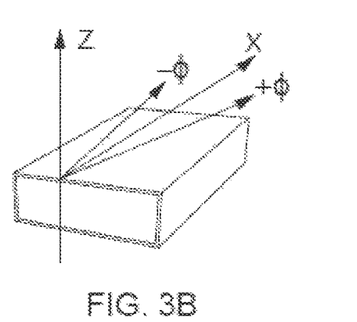
Figure 3C:
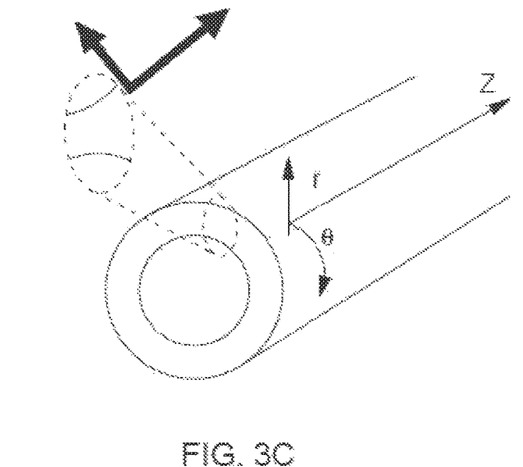

FIG. 3b shows a schematic representation of an example of fibre directions for a tubular structure 1 that is formed by 2D braiding of the longitudinal 10 and hoop 12 fibres. The mechanical requirements of high strength along the longitudinal direction (represented by the axis labelled x in FIG. 3b) can be achieved through triaxial braiding, and varying the size of the fibres in the different directions of the braid. The longitudinal fibres 10 are thicker than the "hoop" fibres 12 which in this example are in fact oriented at angles of ±φ relative to the longitudinal fibres 10. For example, for a quasi-isotropic triaxial braid, φ=60°, and therefore the triaxial braid would consist of fibres oriented at 0°, −60°, and +60°. The angles ±φ can be adjusted to suit the end function of the tube 90 to maximise the mechanical properties of the fibres. Where the structure is formed by triaxial braiding, but the quasi-isotropic formation is not suitable, for example, the braids in the x-y plane may be oriented at φ=45°-75° relative to the longitudinal fibres.

The fraction of fibres 10, 12, 14 in the different directions of the tubular walls (x, y, and z in the case of weaving as shown in FIG. 3a; x, z, and ±φ where the tubular structure 1 is formed by triaxial braiding as shown in FIG. 3b) can be varied according to the requirement of the design of the tube, and the final operative use of the tube 90. Thus, different fractions of fibres 10, 12, 14, will be present along different directions of the composite preform, allowing tailoring of the mechanical properties (stiffness and strength) of the tube 90 along each direction. The angles can be changed according to the method of production of each of the plies of the tubular structure 1.

Some exemplary ranges of fibre fractions for a tubular structure 1 formed by 2D braiding, such as that shown in FIG. 3b, are: fibres in the x-direction between 20-70 vol %; fibres in the z-direction between 1-20 vol %; and the remaining fibre fraction being those aligned along the ±φ directions. For example, for a tubular element that is significantly stressed in the longitudinal (x) direction, the fractions may be 60 vol % in the x-direction, 10 vol % in the z-direction, and 30 vol % for those in the ±φ directions. For a triaxial quasi-isotropic braiding giving almost isotropic properties in the x-y plane and with good strength in the z-direction, the fractions may be 30 vol % in the x-direction; 10 vol % in the z-direction, and 60 vol % in the ±φ directions.

Figure 5:
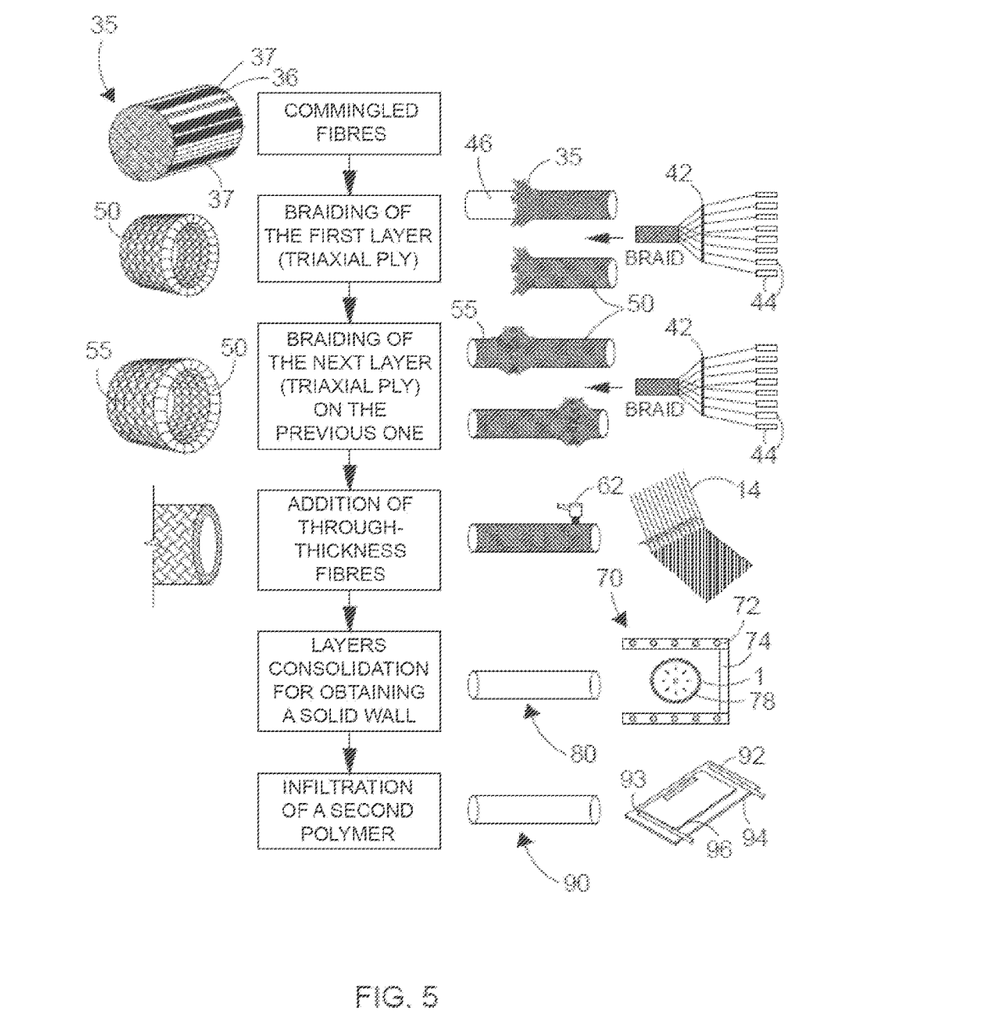
FIG. 5 shows steps of manufacture of a tubular element in accordance with the present disclosure.

Some exemplary ranges of fibre fractions for a tubular structure 1 formed by 3D weaving, such as that shown in FIG. 3a, are: fibres in the x-direction 10 between 30-80 vol %; fibres in the y-direction 12 between 10-50 vol %; and fibres in the z-direction 14 between 1-20 vol %. For example, for a tubular element 90 that is heavily stressed in the longitudinal (x) direction, the fractions may be 70 vol % of fibres in the x-direction 10, 25 vol % of fibres in the y-direction 12, and 5 vol % of fibres in the z-direction 14. For a tubular element 90 subject to medium longitudinal stress and high pressure, the fractions may be 45 vol % of fibres in the x-direction 10, 45 vol % of fibres in the y-direction 12, and 10 vol % of fibres in the z-direction 14. For a tube 90 that is subject to very high risk of delamination, the fractions may be 40 vol % of fibres in the x-direction 10, 40 vol % of fibres in the y-direction 12, and 20 vol % of fibres in the z-direction 14.

Where the tubular structure 1 is produced by fibre braiding, the structure 1 can be formed by using a standard mandrel 46 with the braiding ring 42 and spool 44 shown in FIG. 5. The braided fibres have voids through which the fibres in the z-direction 14 can be passed during stitching, tufting, or z-pinning operations. The first layer of co-mingled fibres 35 is formed on the mandrel 46 by braiding. Further layers 55 are then braided over the top of the first layer 50, with subsequent layers being built up as required.

Figure 4:
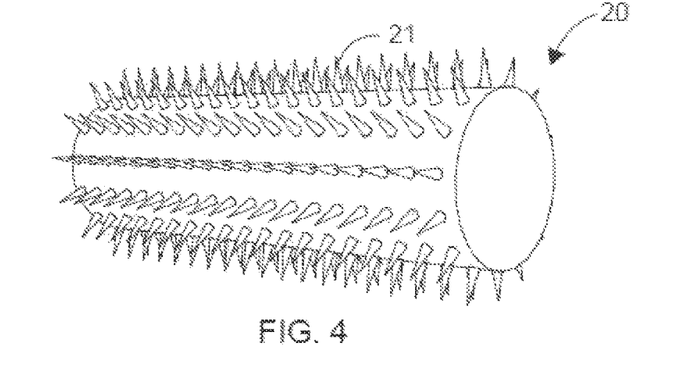
FIG. 4 shows an example of a mandrel with exterior pins for use in perforating braided tapes to facilitate installation of z-directed fibres in the tubular structure.

Alternatively, the tubular structure 1 can be produced by using pre-consolidated tapes instead of fibres (not shown). The tapes consist of aligned S2-type glass fibres impregnated with PEEK, which are woven or braided to form the 2D composite preform. The width of the tapes can be varied in different directions in a similar manner to the varying of the thickness of fibres, in order to maximise the mechanical properties of the resulting tube 90. In contrast to fibre braiding, the use of tapes results in a dense structure, with narrow tape producing a higher density structure in comparison to wider tape. In order to create physical space for the z-directed fibres 14 to pass through the plies of the structure, a mandrel 20 as shown in FIG. 4 may be used. The outer surface of the mandrel 40 has a plurality of hollow pins 21 attached and facing in an outward direction. These pins 21 pierce the layers of tape to create holes for the z-directed fibres 14 to pass through.

Once the layers 50, 55 have been completed, the z-direction fibres 14 are inserted through the layers 50, 55 using a stitching/tufting/z-pinning appliance 62.

Once the z-directed fibres 14 have been inserted, the layers of the structure must be consolidated through curing of the PEEK polymer co-mingled with the fibres, forming a consolidated tubular structure 80. The consolidation is achieved by inserting the tubular structure 1 into the mould 74 of a curing apparatus 70 as shown in FIG. 5. The heating element 72 applies heat at a high temperature to the tubular structure 1, while a bladder 78 applies pressure to the inner circumference of the tubular structure 1, producing the consolidated structure 80.

PEEK is used as it meets the following requirements for the polymer being used in the consolidation process:

Glass transition temperature (Tg) between 80° C.-150° C.; capable of withstanding the temperature of extracted fluid such as oil and/or gas without losing any of its mechanical properties;

High chemical resistance to fluid carried in the tube such as oil and corrosive substances, e.g. sulfidric acid (H2S)—able to resist the fluid for a suitable minimum length of time in the unstressed state, and the mechanical properties of the composite material are within approximately 10%-15% of the original properties after the material is removed from exposure to the fluid;

Low, or no, swelling due to contact with the fluid, e.g. oil or other substances—the composite material absorbs less than 1% in volume of the tubular wall; and Low permeability to selected gases, e.g. methane CH4, sulfidric acid H2S, etc. with a permeation coefficient lower than 10-8 cm2s-1atm-1.

The consolidation process could leave some porosity in the consolidated structure 80 to reduce or prevent bending of the z-directed fibres 14 during consolidation. In order to eliminate the porosity, the consolidated structure 80 could be infused with a second polymer. The second polymer optionally meets the following requirements:

Low viscosity (<50 Poise) at the temperature of infusion;
High chemical resistance comparable to that of the consolidated structure 80;
Young's modulus lower than that of the consolidated structure 80 in the operative temperature range;
Higher deformability than the consolidated structure 80 in the operative temperature range;
Slight swelling (determined by the amount of liquid material that can be absorbed by the composite, which should be lower than 5% in volume) due to contact with fluid such as oil or other substances; and
Low permeability to fluid, with a permeation coefficient lower than 10-8 cm2s-1atm-1.

The second polymer is applied using a vacuum infusion process. The consolidated structure 80 is placed into a mould and a vacuum is produced by sucking air out of the mould via spiral tubing 92 and the vacuum tubing 94. Creation of a vacuum within the mould then draws the second polymer into the mould through the inlet 96 and spiral tubing 93, and infuses the polymer into the consolidation structure 80 by using vacuum pressure. Infiltration by the second polymer seals the porosity left in the consolidated structure 80 and creates the final tube 90, which is ready for use.

Modifications and improvements may be made to the embodiments hereinbefore described without departing from the scope of the disclosure.

The invention claimed is:

1. A composite tubular element for use in a subsea environment, the composite tubular element comprising:
at least a first layer comprising first fibres oriented in an x-direction relative to a longitudinal axis of the tubular element, and second fibres oriented in a y-direction relative to the longitudinal axis of the tubular element, thereby forming a two-dimensional tubular structure;
third fibres extending at least partially through a wall thickness of the tubular element, thereby forming a three-dimensional tubular structure;
a polymer matrix composite consisting of a first thermoplastic polymer arranged to embed the first, second and third fibres of the tubular structure and thereby consolidate the tubular structure; and
a second polymer arranged to fill residual porosity of the tubular structure and thereby form the tubular element.

2. The composite tubular element as claimed in claim 1, wherein the first, second, and third fibres form first, second, and third sets of fibres respectively, and wherein the first, second and/or third sets of fibres are continuous fibres.

3. The composite tubular element as claimed in claim 2, wherein at least one of the first, second, and/or third fibres are non-crimped.

4. The composite tubular element as claimed in claim 1, wherein the first, second and third fibres are glass fibres.

5. The composite tubular element as claimed in claim 1, wherein the two-dimensional tubular structure is formed by triaxial braiding.

6. The composite tubular element as claimed in claim 5, wherein the three-dimensional tubular structure is formed by stitching, tufting, or z-pinning the third fibres.

7. The composite tubular element as claimed in claim 6, wherein the first fibres have a first thickness, and the second fibres have a second thickness, and the first and second thicknesses have different values.

8. The composite tubular element as claimed in claim 5, wherein the second fibres are oriented at angles ±φ relative to the first fibres, wherein φ is within the range 30°-80°.

9. The composite tubular element as claimed in claim 1, wherein the composite tubular element comprises more than one co-axial layer of first and second fibres.

10. The composite tubular element as claimed in claim 1, wherein the third fibres are continuous.

11. The composite tubular element as claimed in claim 1, wherein the third fibres are discontinuous, and wherein the third fibres have a length that is greater than the critical length of the fibres.

12. The composite tubular element as claimed in claim 1, wherein the three-dimensional tubular structure is formed by three-dimensional weaving or braiding.

13. The composite tubular element as claimed in claim 1, wherein the first, second, and third fibres each constitute a fraction of total fibres making up the composite tubular element, and wherein the first fibres are between 30-80 vol %, the second fibres are between 10-50 vol % and the third fibres are between 1-20 vol %, the fraction of first, second, and third fibres being selected to tailor the mechanical properties of the composite tubular element in each direction according to stresses that the composite tubular element will experience in use.

14. The composite tubular element as claimed in claim 1, wherein the first and second fibres are grouped in the form of pre-consolidated tapes.

15. The composite tubular element as claimed in claim 1, wherein the first thermoplastic polymer is included in the tubular structure together with the fibres, forming a polymer matrix.

16. The composite tubular element as claimed in claim 1, wherein the first thermoplastic polymer is melted to consolidate the tubular structure.

17. The composite tubular element as claimed in claim 1, wherein the second polymer is a thermosetting polymer.

18. The composite tubular element as claimed in claim 1, wherein the second polymer is a thermoplastic polymer.

19. The composite tubular element as claimed in claim 17, wherein the second polymer is applied to the tubular structure at the same time as the first thermoplastic polymer.

20. The composite tubular element as claimed in claim 17, wherein the second polymer is applied to the tubular structure after consolidation of the tubular structure.

21. The composite tubular element as claimed in claim 1, wherein the second polymer has a lower Young's modulus than the consolidated tubular structure.

22. The composite tubular element as claimed in claim 1, wherein the second polymer has a higher deformability than the consolidated tubular structure.

23. The composite tubular element as claimed in claim 1, wherein the second polymer is an elastomer.

24. The composite tubular element as claimed in claim 1, wherein the composite tubular element is a riser.

25. A method of manufacture of a composite tubular element, the method including the steps of:
producing a two-dimensional tubular structure comprising first fibres oriented in an x-direction relative to a longitudinal axis of the tubular element, and second fibres oriented in a y-direction relative to the longitudinal axis of the tubular element;
inserting third fibres at least partially through a wall thickness of the tubular element to produce a three-dimensional tubular structure;
forming a polymer matrix composite consisting of a first thermoplastic polymer incorporating the fibres of the three-dimensional tubular structure; and
applying a second polymer to fill residual porosity of the tubular structure to form the composite tubular element.

* * * * *